July 15, 1952 A. E. KILPELA 2,603,106
HELICOPTER TRANSMISSION
Filed Aug. 9, 1944 2 SHEETS—SHEET 2
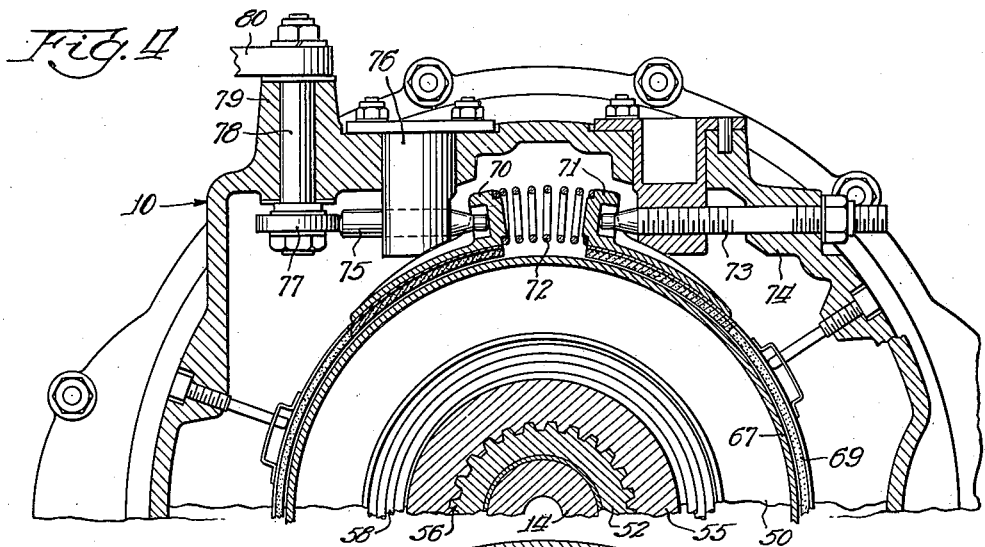
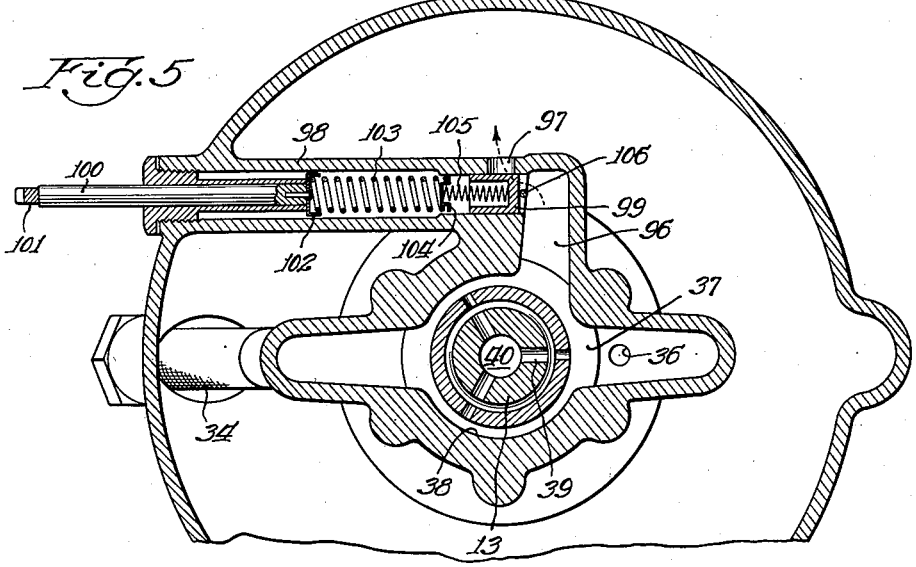
Inventor:
Ano E. Kilpela Patented July 15, 1952

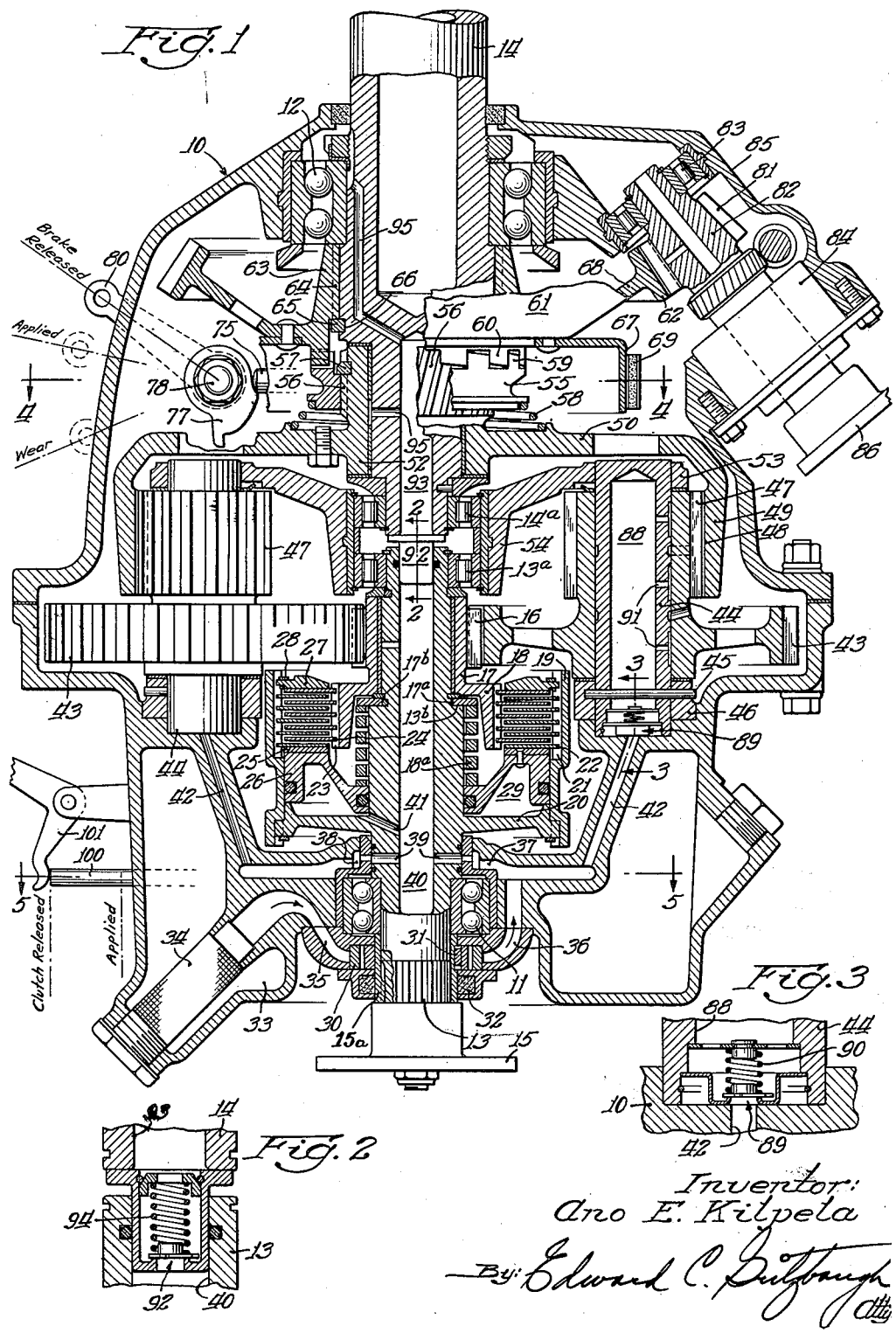

2,603,106

UNITED STATES PATENT OFFICE 2,603,106

HELICOPTER TRANSMISSION

Ano E. Kilpela, Detroit, Mich., assignor to Borg-Warner Corporation, Chicago, Ill., a corporation of Illinois Application August 9, 1944, Serial No. 548,639

7 Claims. (Cl. 74—665)

This invention relates to transmission gearing and it is particularly directed to transmissions for driving the main supporting shaft and rotor blades of a helicopter or similar aircraft wherein the rotational axis of the assembly is vertically disposed.

It is one of the principal objects of this invention to simplify the construction of a transmission gearing of the character contemplated herein, and to improve the efficiency, operation and dependability of such transmission gearing.

It is also one of the principal objects of this invention to provide an assembly of the character herein contemplated wherein disconnection of the engine or prime mover from the transmission may be readily accomplished so that the motor may be or idled or tested without driving the rotor or operating the shaft that supports the same and transmits torque thereto.

Another principal object hereof resides in the provision of means, preferably comprising a positive one-way clutch that will permit the main or sustaining rotor to idle independently of the power means to effect gradual descent and a safe landing of the helicopter in the event of failure or stalling of the engine. In this connection, provision is made in the present structure whereby upon failure of the engine the tail or torque control will be operated during rotation of the main or sustaining rotor through instrumentalities interposed between and operatively connecting the main rotor shaft and the take-off shaft that drives the tail rotor.

A still further object of the present invention is to provide a lubricating system, preferably of the forced-feed or pump type that effects a positive distribution of lubricant to the various instrumentalities of the transmission. The pump for discharging the pressure lubricant into the various ducts or passages is so constructed and located in the assembly that it is readily accessible and may be removed with a minimum of labor. The pressure lubricant also provides the means for actuating a hydraulic piston for effecting engagement of the members of a clutch that is interposed in the transmission assembly.

It is preferred to accomplish the numerous objects of the invention contemplated herein and to practice the same in substantially the manner hereinafter fully described and as more particularly pointed out in the appended claims. Reference is now made to the accompanying drawings forming a part hereof wherein:

Fig. 1 is a vertical axial section of an assembly embodying the instrumentalities of the present invention, the structure being particularly adapted for use in aircraft of the helicopter type;

Fig. 2 is a fragmental sectional view on the plane of line 2—2 on Fig. 1, drawn to an enlarged scale;

Fig. 3 is an enlarged sectional view taken on the plane of line 3—3 on Fig. 1;

Fig. 4 is a horizontal sectional view taken on the plane of line 4—4 on Fig. 1 looking in the direction of the arrows; and Fig. 5 is a horizontal sectional view taken on the plane of line 5—5 on Fig. 1 looking in the direction of the arrows.

The drawings are to be understood as being more or less of a schematic character for the purpose of disclosing a typical or preferred form of the improved transmission gearing contemplated herein, and in these drawings like reference characters identify the same parts in the several views.

The form of this invention which is shown in the drawings preferably embodies a suitably shaped housing 10 that is anchored in any suitable manner to the body or framework of an aircraft such as a helicopter, and there are axially aligned bearings 11 and 12 respectively in the lower and upper portions of said housing. The drive shaft 13 is rotatably supported in the lower bearing 11, and the driven shaft 14 for the sustaining rotor is rotatably supported in the upper bearing 12. These shafts 13 and 14 are disposed in axial alignment with each other and there is a speed reduction and torque multiplication of the desired ratio between said shafts that is effected by means of a transmission gearing assembly that operatively connects the portions of the shafts within the housing 10.

The drive shaft 13 is connected to the engine shaft or other prime mover by means that comprise the flange 15 splined to the lower end portion of said shaft 13 that is projected below the housing and the bearing 11, said flange being maintained in place by the usual nut and retainer disc arrangement. Suitable connection (not shown) is made between the driven shaft 14 and the sustaining rotor of the helicopter that operates above the body of the aircraft. Within the housing 10 the ends of the drive shaft 13 and driven shaft 14 terminate adjacent each other, and said end portions of these shafts are journaled in bearings 13a and 14a respectively.

The instrumentalities that operatively connect the drive shaft 13 to the driven rotor shaft 14 are preferably a transmission gearing comprising a drive pinion 16 that is loosely mounted upon the upper portion of the drive shaft 13 beneath the bearings 13a, the said pinion being formed upon one end portion of a sleeve 17 that is provided with an enlarged bell-shaped, lower portion 18 disposed in spaced relation laterally of drive shaft 13 and forms a portion of a clutch. The sleeve is freely rotatable relative to drive shaft 13 and rests upon a washer 17a that is seated on a shoulder 13b on the power shaft 13, the washer being maintained in place by a snap-ring 17b.

The clutch, which is preferably of the multiple plate friction type, comprises the drum 19 that surrounds the portion 18 of the sleeve 17 and is disposed in spaced relation thereto, said drum being supported and driven by the marginal toothed portion of a lateral flange 20 preferably integral with drive shaft 13. Internal splines 21 are formed on drum 19 to drive friction plates 22, and there are external splines 23 on the sleeve 18 to coact and rotate with the driven friction plates 24 that are alternately disposed between the friction drive plates 22.

An annular pressure plate 25, operating in the drum 19, transmits force to engage the friction plates 22 and 24, the force being derived from an oil-pressure actuated piston 26 operating against the pressure plate 25. An annulus 27, driven by splines 21 on the drum, is positioned above the friction plates 22 and 24, and together with a snap ring 28, provides an abutment or stop that opposes the action of the pressure plate 25 and piston 26 and limits the movement of the friction clutch plates axially of the drive shaft 13. A heavy coiled spring 18a surrounds the drive or power shaft 13 between the sleeve-supporting washer 17a and the inner lower portion of piston 26 to urge the piston downward in a direction to disengage the clutch plates 22 and 24.

Pressure fluid, preferably lubricating oil under pressure, is supplied to a chamber 29, that is coaxial with the clutch back of the piston 26, by a pump 30 that surrounds a sleeve 15a splined on the lower portion of drive shaft 13, and which is abutted by the cylindrical portion of flange 15 to rotate with said shaft and flange. The pump 30 has its movable member secured to the sleeve 15a by a key 31. The pump which is below the bearing 11 is held in place by a flange in which may be incorporated a stuffing member or oil seal ring 32 that is engaged by the sleeve 15a, thus providing an arrangement that permits the pump to be readily removed by dismounting the flange 15 and the adjacent sealing flange without disturbing the bearing 11.

The oil for the pump passes from the sump 33 in the bottom of housing 10 through a strainer 34 and passageway 35 to the suction port of the pump, and it discharges under pressure into a feed passageway 36 having a branch 37 communicating with an annular channel 38 surrounding drive shaft 13 above the bearing 11, and thence through lateral ports 39 into the bore 40 of said drive shaft. One or more oblique passages 41 in shaft 13 establish communication between the piston chamber 29 and the shaft bore 40 so that the pressure fluid is effective upon the piston 26 to frictionally engage the plates 22 and 24 which will operate this friction clutch when the oil pressure overcomes the urge of the spring 18a.

A portion of the oil under pressure is led by passages 42 away from the annular channel 38 to lubricate parts of the transmission assembly to be later described herein.

The transmission drive pinion 16 that is operatively connected to the drive shaft 13 when the friction plates 22 and 24 of the clutch are engaged, is meshed with a plurality of fixed gears 43 mounted for rotation upon stationary countershafts 44 that are secured by pins 45 to a ring portion 46 mounted on an inwardly projecting portion of housing 10. The hubs of gears 43 are elongated and are formed with pinions 47 that mesh with an internal gear 48 formed in the annular flange 49 of a large disc 50 that is integral with a central sleeve 52 surrounding a reduced lower portion of the rotor or driven shaft 14. A radially disposed bracket portion 53 has openings into which the upper ends of countershafts 44 are inserted, and the portions 53 and 46 are integral with each other and form a cage for the shafts 44. The cage comprising the portion 53 and 46 is fixed with respect to the housing 10 by any suitable means and including the shafts 44 which at their lower ends extend into suitable openings in the housing. The central sleeve 54 of the cage, as shown, surrounds the inner bearings 13a and 14a of the respective shafts 13 and 14.

The internal gear 48, together with its sleeve 52, is connected to the rotor shaft 14 by means of a driving device that is preferably a positive one-way clutch assembly of the toothed type. One member of this clutch comprises an annular collar 55 surrounding the sleeve 52 and movable in an axial direction thereon through a helically splined connection 56 therewith. This collar is urged upward against a stop-ring 57 by the thrust due to the helically splined connection when the engine is driving and by helical spring 58 interposed between the lower portion of said collar and the upper face of the disc 50 that carries the internal gear 48. The upper edge of collar 55 is castellated to provide axially extending teeth 59 that mesh with similar axially extending teeth 60 on the other or opposing member 61 of the clutch. This other clutch member 61 comprises the lower hub portion of a large bevel gear 62 that surrounds the rotor shaft 14 above the positive clutch and has an upper elongated sleeve portion 63 that has a splined connection 64 with said rotor shaft so that it turns therewith. The sleeve 63, gear 62 and its hub provide the output member of this clutch and transmission assembly. The upper end of the sleeve 63 abuts the bearing 12 and the lower ends of the splines rest upon a split ring 65 that is sprung into an annular groove 66 in the adjacent portion of the rotor shaft 14.

The brake drum 67 is anchored to the web 68 of the bevel gear 62 in the manner shown and it is surrounded by a friction brake-band 69 (Fig. 4) that is provided with the usual terminal lugs 70 and 71 between which there is interposed a coiled spring 72 that is under compression to normally urge the lugs in opposite directions away from each other to loosen the brake-band 69. Lug 71 is engaged by the inner end of a stop bolt 73 that is screwed into and through a threaded boss 74 and it has an outer slotted end projected through the housing 10 to permit longitudinal adjustment thereof for taking up wear in band 69. The other lug 70 is engaged by the inner end of a plunger 75 having reciprocating longitudinal movement in a bearing 76, such movement being effected by a rotary reciprocable edge cam 77 that engages the other or outer end of said plunger 75. Cam 77 is secured to the inner end of a rock-spindle 78 disposed with its axis transverse to the axis of plunger 75 and mounted in a bearing boss 79 formed integral with the adjacent portion of the housing. The outer end of this spindle that projects beyond the housing is provided with a crank-arm 80 to which manually operated means are connected for rocking the spindle to operate the brake band 69 to constrict it upon or loosen it from the brake-drum 67. When the brake structure is tightened during operation of the rotor shaft, the rotation of the clutch member 60 will be arrested together with the rotor shaft to which it is splined.

The bevel gear 62 meshes with a bevel pinion 81 that is formed upon a shaft 82 which is disposed with its axis oblique to the axis of rotation of the transmission assembly, and it is journaled by bearings 83 and 84 in a hollow boss 85 preferably cast with the housing 10. One end of this shaft 82 is provided with an attaching flange 86 having internal splines for operatively connecting the shaft to the instrumentalities (not shown) for transmitting torque to the control rotor or other devices of the helicopter or other aircraft.

Pressure lubricant from the pump 31 is fed to the various operating parts of the transmission assembly through an oil-distributing system of ducts and the like. The ducts 42 are adapted to discharge into the bores 88 of the countershafts 44 of the transmission assembly and such discharge is controlled by spring-seated outward pressure valves 89 in the bottoms of the bores 88 so that the oil will not be admitted to such bores 88 until the pressure of the lubricant is sufficient to overcome the tension of the control springs 90 that urge the valves into their closed positions. Thereafter the oil will be discharged through a plurality of lateral ports 91 to lubricate the adjacent members of the assembly. Interposed between the ends of the power shaft 13 and rotor shaft 14, there is a spring-seated outward pressure valve 92 that controls the flow of lubricant from the shaft bore 40 into the bore 93 in the lower portion of said rotor shaft. This valve 92 operates as a pressure relief valve in the same manner as valve 89 to permit passage of lubricant into rotor shaft bore 93 when the pressure of the lubricant overcomes the urge of the valve seating spring 94, and the oil will then be distributed to the working parts of the adjacent structure through ducts 95.

The hydraulically operated friction clutch assembly that surrounds the power shaft 13 is manually controlled by instrumentalities that are disclosed in Fig. 5, wherein it will be seen that the annular lubricant chamber 38 communicates with a lateral passage 96 leading to a discharge port 97 in an elongated hollow boss 98. A cup-shaped sliding valve 99, which controls communication between the lateral passage 96 and the discharge port 97, is adapted to be moved by the pressure lubricant to uncover the port so that the lubricant will overflow or spill back into the oil sump 33 when the lubricant is not needed to operate the clutch. A plunger rod 100, operated by a bell-crank 101, is adapted for longitudinal reciprocable movement in the hollow boss 98, and at its inner end said rod 100 is provided with a stamped cup 102 to seat an end of a coiled spring 103 that has its other end seated against a follower 104. Between the follower and the slide valve 99 there is a spring 105 of lighter tension than the spring 103, and at the end of the bore of the hollow boss 98 there is a stop 106 that arrests movement of the valve to the right (Fig. 5). When the friction clutch is released, the pressure lubricant will be by-passed through the port 97 and returned to the sump, and when it is desired to utilize the pressure lubricant to operate the piston 26 and frictionally engage the members of this clutch the bell-crank is manually rocked to push the plunger rod 100 inward so that the heavier spring 103 will overcome the lighter spring 105 to such an extent that follower 104 will contact valve 99 and force the valve against the stop 106 and close the discharge or overflow port 97. The pressure which is controlled by valve 92 will then build up in the clutch chamber 29 and will be effective upon the piston 26 to force it upward and effect frictional engagement of the clutch plates 22 and 24 which will operate the transmission gearing to rotate the rotor shaft 14. The pressure will likewise open valves 89 and 92 to lubricate the various moving parts.

The function of light spring 105 is to maintain a slight pressure for lubrication purposes when the clutch is disengaged.

While this invention has been described in detail in its present preferred form or embodiment, it will be apparent to persons skilled in the art, after understanding the improvements contemplated herein, that various changes and modifications may be made therein without departing from the spirit or scope thereof. It is aimed in the appended claims to cover all such changes and modifications.

I claim:

1. A transmission for driving the main rotor and control rotor of a helicopter, comprising a rotatable power shaft and a driven main rotor shaft; a gear train for effecting torque multiplication between said shafts; a clutch for effecting one-way driving connection between said gear train and said main rotor shaft, said clutch comprising a first toothed member splined to said rotor shaft; a second toothed member rotated by the output member of the gear train and being yieldably urged toward the first toothed member to mesh with the teeth thereof; a bevel gear carried by the first toothed member; a power take-off pinion meshed with said bevel gear for driving a control rotor of the helicopter; and a manually operated brake assembly connected with said first toothed member.

2. A transmission as defined in claim 1, wherein the brake assembly comprises a friction brake-drum connected to the first toothed member; a constrictable brake-band surrounding said drum; and manually operable means for frictionally engaging said band upon said drum.

3. A transmission for driving the main rotor and control rotor of a helicopter, comprising a rotatable power shaft and a driven main rotor shaft; a gear train for effecting torque multiplication between said shafts; a clutch for effecting one-way driving connection between said gear train and said main rotor shaft, said clutch comprising a first toothed member splined to said rotary shaft; a second toothed member splined to the output member of the gear train; a spring normally urging the second toothed member into meshed engagement with the first toothed member; a bevel gear formed integral with the first toothed member; a power take-off pinion meshed with said bevel gear for driving a control rotor of the helicopter; a friction brake drum secured to said bevel gear; a band surrounding said drum; and manually operated means for effecting frictional engagement of the band with the drum.

4. A transmission for driving the main rotor and control rotor of a helicopter, comprising a rotatable power shaft and a driven main rotor shaft; a multiple countershaft gearing for effecting torque multiplication between said shafts; a clutch for effecting one-way driving connection between said gear train and said main rotor shaft, said clutch comprising a first toothed member splined to said rotor shaft; a second toothed member splined to the output member of the gearing and being yieldably urged toward the first toothed member to mesh with the teeth thereof; a bevel gear formed integral with the first toothed member; an oblique web between the bevel gear and the first toothed member to position said bevel gear in a plane above said member; a power take-off pinion meshed with said bevel gear for driving a control rotor of the helicopter, the axis of said pinion being oblique to the axis of the bevel gear; and a manually operated brake assembly connected with said first toothed member.

5. In a power transmitting mechanism for a helicopter, a drive shaft, a driven rotor shaft for driving the rotor of the helicopter, a positive one-way overrunning clutch mechanism adapted to connect said shafts to permit overrunning of the rotor shaft, said clutch comprising a toothed collar splined to the rotor shaft and having a brake drum connected to said collar, an axially movable toothed member drivingly connected to the drive shaft and engageable with the toothed collar, and manually operable friction engaging means coacting with the brake drum and engageable at will for arresting the rotation of the toothed collar to thereby prevent overrunning of the rotor shaft when the helicopter is grounded and said drive shaft is stationary.

6. In a power transmitting mechanism for a helicopter, a drive shaft, a driven rotor shaft for driving the rotor of the helicopter, a positive one-way overrunning clutch mechanism for connecting said shafts to permit overrunning of said rotor shaft, said clutch comprising a first toothed member secured to the rotor shaft and having a brake drum connected to said member, a second toothed member rotated by the drive shaft, means for yieldably urging the second toothed member into operative engagement with the first toothed member, and manually operated engaging means coacting with the brake drum and engageable at will for arresting rotation of the first toothed member to prevent overrunning of the rotor shaft when the helicopter is grounded and said drive shaft is stationary.

7. In a power transmitting mechanism for a helicopter, a rotary drive shaft, a driven rotor shaft for driving the rotor of the helicopter, a positive one-way overrunning clutch mechanism for connecting said shafts and permitting overrunning of said driven rotor shaft, said clutch comprising a toothed collar splined to the rotor shaft and having a brake drum connected to said collar, an axially movable toothed member, a helical splined connection operatively connecting said axially movable toothed member and said drive shaft, means biasing said axially movable member into operative engagement with the toothed collar, the direction of inclination of the splines of said connection being such as to assist said biasing means in effecting engagement of the toothed collar and axially movable member when said drive shaft is rotated, and manually operable friction means operable at will and coacting with the brake drum for arresting rotation of the toothed collar to prevent free rotation of the rotor shaft when said drive shaft is stationary.

ANO E. KILPELA.

REFERENCES CITED

The following references are of record in the file of this patent:

UNITED STATES PATENTS

| Number | Name | Date |
| --- | --- | --- |
| 1,376,033 | Page | Apr. 26, 1921 |
| 1,661,613 | Jackson | Mar. 6, 1928 |
| 1,774,618 | Thompson | Sept. 2, 1930 |
| 1,897,180 | Ronk | Feb. 14, 1933 |
| 1,928,191 | Van Meurs | Sept. 26, 1933 |
| 2,062,930 | Pritchard | Dec. 1, 1936 |
| 2,211,781 | Joy et al. | Aug. 20, 1940 |
| 2,226,309 | Glassman | Dec. 24, 1940 |
| 2,317,957 | Frudden | Apr. 27, 1943 |

FOREIGN PATENTS

| Number | Country | Date |
| --- | --- | --- |
| 460,824 | Great Britain | June 11, 1936 |